(12) United States Patent
Kawamata

(10) Patent No.: US 7,849,823 B2
(45) Date of Patent: Dec. 14, 2010

(54) OPERATING METHOD AND FUEL SUPPLY SYSTEM FOR AN INTERNAL COMBUSTION ENGINE

(75) Inventor: Noriyuki Kawamata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 524 days.

(21) Appl. No.: 11/978,708

(22) Filed: Oct. 30, 2007

(65) Prior Publication Data

US 2009/0205606 A1    Aug. 20, 2009

(30) Foreign Application Priority Data

Nov. 30, 2006 (JP) .............................. 2006-323362

(51) Int. Cl.
  *F02B 47/02* (2006.01)

(52) U.S. Cl. ..................... 123/25 E; 123/25 J

(58) Field of Classification Search ............... 123/25 R, 123/25 J, 25 E, 25 F, 25 K–25 N
See application file for complete search history.

(56) References Cited

U.S. PATENT DOCUMENTS

| 7,287,492 | B2 * | 10/2007 | Leone et al. | ................. | 123/1 A |
| 7,426,908 | B2 * | 9/2008 | Brehob | ...................... | 123/25 E |
| 7,533,651 | B2 * | 5/2009 | Surnilla | ..................... | 123/25 E |
| 7,647,916 | B2 * | 1/2010 | Leone et al. | ............... | 123/25 E |

FOREIGN PATENT DOCUMENTS

| EP | 0154975 A2 | 9/1985 |
| GB | 2384525 A | 7/2003 |
| JP | 58148244 A * | 9/1983 |
| JP | 59077067 A * | 5/1984 |
| JP | 59-199025 A | 11/1984 |
| JP | 7-501373 A | 2/1995 |
| JP | 2004-68666 A | 3/2004 |
| JP | 2004-76608 A | 3/2004 |
| JP | 2006241243 A * | 9/2006 |
| WO | WO 93/10347 A1 | 5/1993 |

OTHER PUBLICATIONS

WO 95/25154, Auer, Sep. 1995.*
WO 92/07922, Gunnerman, May 1992.*
WO 01/36105 A1, Yahiro, May 2001.*

* cited by examiner

*Primary Examiner*—Noah Kamen
(74) *Attorney, Agent, or Firm*—Birch, Stewart, Kolasch & Birch, LLP

(57) ABSTRACT

A fuel supply system attached to the gasoline engine includes a first tank storing a mixture of gasoline and ethanol, a second tank storing water, a microbubble generator connected to the first and second tanks, and a fuel injection valve connected to the microbubble generator. The mixture and the water are mixed in an environment where microbubbles generated by operation of the microbubble generator are supplied. The mixed fuel thus prepared is injected, via the fuel injection valve, into a supply pipe connected to a cylinder block which is included in the gasoline engine. The mixed fuel is then mixed with the air flowing through the supply pipe to be supplied into a combustion chamber. The resulting configuration lowers the combustion temperature in the gasoline engine so as to reduce the amount of NOx contained in exhaust gas.

18 Claims, 2 Drawing Sheets

OPERATING METHOD AND FUEL SUPPLY SYSTEM FOR AN INTERNAL COMBUSTION ENGINE

CROSS-REFERENCE TO RELATED APPLICATION

The present application claims priority under 35 U.S.C. §119 to Japanese Patent Application No. 2006-323362, filed Nov. 30, 2006, the entire contents of which are hereby incorporated by reference.

BACKGROUND OF THE INVENTION

1. Field of the Invention

The present invention relates to an internal combustion engine operating method in which, to obtain motive power, an internal combustion engine is driven by burning a mixed fuel in a combustion chamber thereof and a fuel supply system for supplying a mixed fuel to a combustion chamber of an internal combustion engine.

2. Description of Background Art

Out of growing concern about environmental problems, use of a mixed fuel of gasoline and ethanol as a fuel for gasoline engines (internal combustion engines) mounted on automobiles is being studied. When a gasoline engine is operated using the mixed fuel, the amounts of carbon monoxide, hydrocarbon, and nitrogen oxide (NOx) contained in the exhaust gas of the gasoline engine are remarkably reduced compared with when the gasoline engine is operated using gasoline only. In addition, with ethanol being a substance which is decomposed naturally, the burden on the environment is largely reduced. In cases where so-called biomass ethanol produced by fermenting, for example, sugarcane or corn is burned, the carbon dioxide that had been captured by the sugarcane or corn is merely released back into the atmosphere, so that no additional carbon dioxide is emitted. Besides, since ethanol is cheaper than gasoline, the cost of engine operation is reduced.

What is described above concerns gasoline engines. For diesel engines which use light oil, too, reducing the amount of NOx in exhaust gas is demanded. Based on this standpoint, use of an emulsion fuel prepared by adding an emulsifying agent to light oil to distribute water in the light oil has been proposed (see, for example, JP-A No. 2004-68666 and JP-A No. H07-501373). It is considered that, when such an emulsion fuel is burned in a combustion chamber, the evaporative latent heat of water lowers the combustion temperature in the combustion chamber resulting in reduced NOx generation.

Referring to JP-A No. 2004-68666 and JP-A No. H07-501373, it is considered that using an ethanol-gasoline mixed fuel added to by water for a gasoline engine also lowers the combustion temperature and further reduces NOx generation. Mixing the mixed fuel containing ethanol accounting for 10% by volume with water in an amount equivalent to 1% by volume of the mixed fuel, however, causes phase separation between the gasoline and water and, as a result, most of the ethanol is transformed into an aqueous phase. This changes gasoline properties, for example, octane number and distillation characteristics.

Thus, operating a gasoline engine using a mixed fuel of gasoline and water involves great difficulty. In view of this situation, it is generally considered that water should not be allowed to mix in with gasoline.

The present invention has been made in view of the above circumstances, and it is an object of the present invention to provide an internal combustion engine operating method in which a mixed fuel of water and gasoline can be burned and a fuel supply system for supplying the mixed fuel to a combustion chamber of the internal combustion engine.

SUMMARY AND OBJECTS OF THE INVENTION

To achieve the above object, the present invention provides an internal combustion engine operating method in which, to obtain motive power, an internal combustion engine is driven by burning a mixed fuel in a combustion chamber thereof. In the method, the mixed fuel is prepared by mixing a mixture of gasoline and ethanol and water in a mixing device.

The mixture and water are mixed in the mixing device without being phase-separated from each other. The fact that ethanol is fairly miscible with both gasoline and water also contributes toward promoting the mixing. Consequently, a mixed fuel of water, alcohol, and gasoline is obtained.

Particularly, when a microbubble generator is used as the mixing device, the microbubble generator generates, using the air it takes in, microbubbles in the mixture (liquid) causing the mixture and water to be broken into fine particles. This further promotes the mixing.

When the mixed fuel is burned in the combustion chamber, the water contained in the mixed fuel is vaporized absorbing heat to lower the combustion temperature in the combustion chamber. This, in addition to the presence of ethanol in the mixed fuel, also contributes toward reducing NOx generation. Namely, according to the present invention, the combustion temperature can be lowered by using a mixed fuel containing water, so that NOx generation can be further reduced.

Moreover, since ethanol and water are cheaper than gasoline, the cost of fuel and the internal combustion engine operating cost can be reduced. This eventually leads to a reduction in the operating cost for an automobile mounted with the internal combustion engine.

An arrangement may also be made such that a mixture of water and ethanol is prepared first to be then added to gasoline. Namely, the present invention provides an internal combustion engine operating method in which, to obtain motive power, an internal combustion engine is driven by burning a mixed fuel in a combustion chamber thereof. In the method, the mixed fuel is prepared by adding a mixture, prepared by mixing water and ethanol in a mixing device, to gasoline.

In this case, too, like in the previous case, a mixed fuel of water, alcohol and gasoline can be obtained, so that the combustion temperature in the combustion chamber can be lowered. As a result, NOx generation can be reduced and the fuel cost can be lowered.

It is preferable to install detection means for detecting the operating condition of the internal combustion engine and adjust, under control of control means, the ratio of the mixture to be added to the gasoline based on information from the detection means. This will make it possible to prevent the temperature in the combustion chamber from rising to such a high level as to cause the NOx generation to greatly increase or dropping to such a low level as to cause the gasoline to be partly left unburned.

The present invention also provides a fuel supply system for supplying a mixed fuel to a combustion chamber of an internal combustion engine, comprising: a first tank storing a mixture of gasoline and ethanol, a second tank storing water, a mixing device for preparing a mixed fuel by mixing the mixture supplied from the first tank and the water supplied from the second tank, and a fuel injection valve for supplying the mixed fuel to a combustion chamber of an internal combustion engine.

With the above configuration, a mixed fuel in which, as described above, water, ethanol, and gasoline are approximately evenly mixed causing no phase separation can be obtained with ease.

A mixture of water and ethanol may be prepared first to be then added to gasoline. To realize such an arrangement, the present invention provides a fuel supply system for supplying a mixed fuel to a combustion chamber of an internal combustion engine, comprising: a first tank storing ethanol, a second tank storing water, a third tank storing gasoline, a mixing device for preparing a mixture by mixing the ethanol supplied from the first tank and the water supplied from the second tank, a control valve which controls a supply of the mixture, and a fuel injection valve, disposed downstream of the control valve, for supplying a mixed fuel of the mixture and the gasoline supplied from the third tank to a combustion chamber of an internal combustion engine.

In this case, it is preferable to provide detection means for detecting the operating condition of the combustion chamber and control means for controlling the degree of opening of the control valve. The control means controls the degree of opening of the control valve based on information from the detection means. As a result, the flow rate of the mixture is controlled and the temperature in the combustion chamber is kept in an appropriate range.

Examples of suitable detection means include temperature detection means which detects the temperature of coolant for cooling the internal combustion engine and knocking detection means which detects knocking.

In any of the above cases, the fuel injection valve may be installed in a supply pipe for supplying air to the combustion chamber of the internal combustion engine. Or, it may be installed to be exposed in the combustion chamber of the internal combustion engine.

Effects of the invention include the following:

According to the present invention, a mixing device is used to mix a mixture of ethanol and gasoline with water or mix ethanol and water, so that a mixed fuel in which water, ethanol, and gasoline are mixed causing no phase separation can be obtained. When the mixed fuel is burned in a combustion chamber of an internal combustion engine, the water contained in the mixed fuel is vaporized absorbing heat to lower the combustion temperature in the combustion chamber, so that NOx generation can be reduced. Moreover, according to the present invention, the mixed fuel also contains ethanol, so that the generation of NOx can be noticeably reduced compared with when gasoline only is burned.

Namely, according to the present invention, a mixed fuel containing water can be used, so that the combustion temperature in a combustion chamber of an internal combustion engine can be lowered. Burning the mixed fuel in such an environment can further reduce NOx generation.

Moreover, with ethanol and water put in use, the fuel cost and the cost of operating an internal combustion engine can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
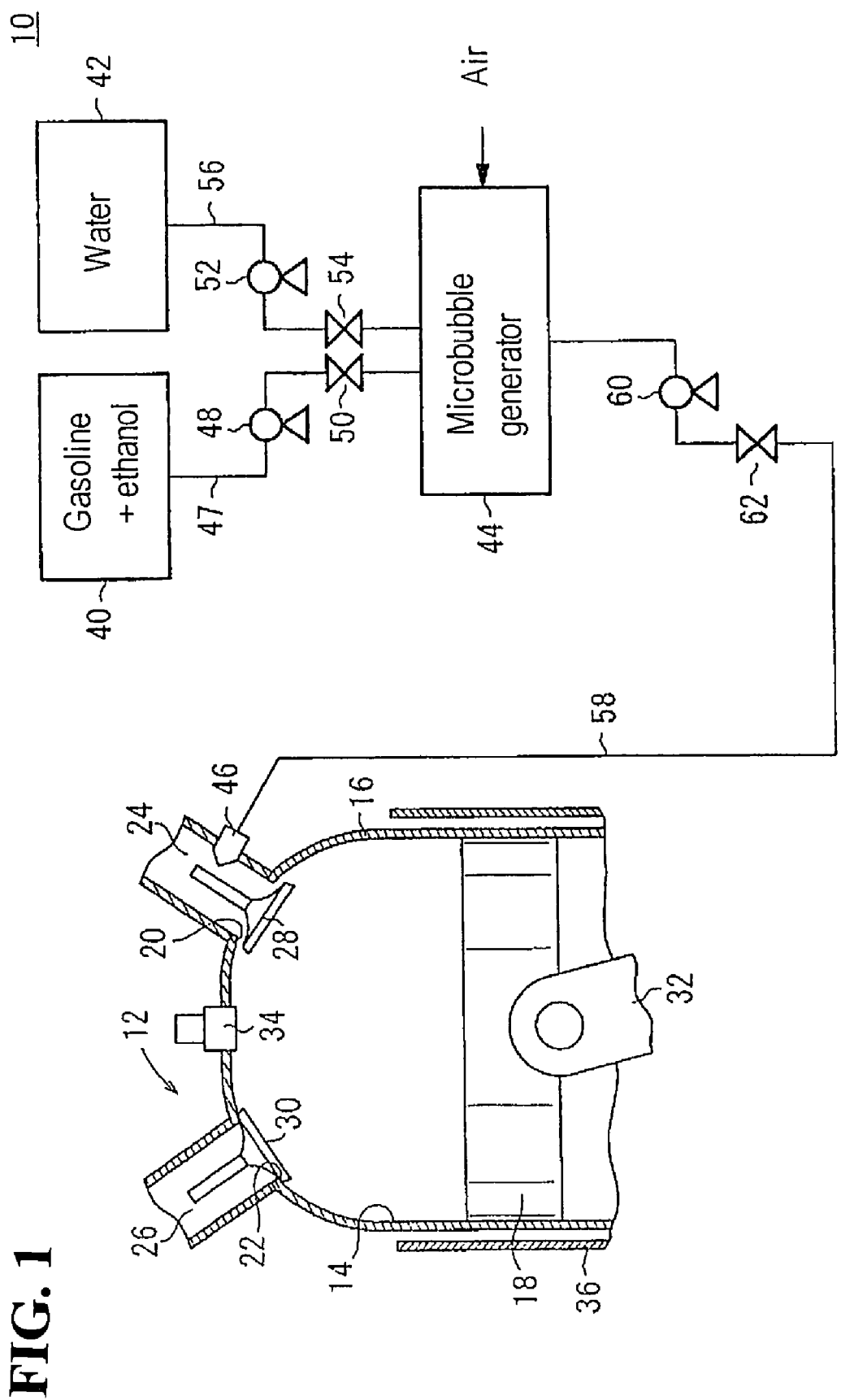
FIG. 1 is a schematic diagram for explaining an overall configuration of a fuel supply system according to a first embodiment of the present embodiment.

FIG. 1 is a schematic diagram for explaining an overall configuration of a fuel supply system 10 according to a first embodiment of the present embodiment. The fuel supply system 10 is attached to a gasoline engine 12 which is an internal combustion engine.

First, the configuration of the gasoline engine 12 will be described.

The gasoline engine 12 includes a cylinder block 16 having a combustion chamber 14 and a piston 18 which slides in the combustion chamber 14. An intake port 20 and an exhaust port 22 are provided in an upper portion of the cylinder block 16 as shown in FIG. 1. The intake port 20 and the exhaust port 22 are connected with a supply pipe 24 and an exhaust pipe 26, respectively.

The intake port 20 is provided with an intake valve 28 which can close and open the intake port 20. Similarly, the exhaust port 22 is provided with an exhaust valve 30 which can close and open the exhaust port 22.

FIG. 1 illustrates a connecting rod 32 fitted to a crankshaft, not shown, which displaces the piston 18 from a top dead center to a bottom dead center and vice versa. Spark plug 34, 36 burn a mixed fuel being described later and a water jacket, respectively. Cooling water used as a coolant to cool the combustion chamber 14 is circulated through the water jacket 36 by a pump, not shown.

The fuel supply system 10 attached to the gasoline engine 12 configured as described above includes a first tank 40 storing a mixture of gasoline and ethanol, a second tank 42 storing distilled water (hereafter referred to simply as "water"), a microbubble generator (mixing device) 44 connected to the first and second tanks 40 and 42, and a fuel injection valve 46 connected to the microbubble generator 44.

The first tank 40 stores the mixture of gasoline and ethanol that contains ethanol accounting for 10 to 23% by volume of the mixture representing 100% by volume. The second tank 42 stores water as stated above.

The first tank 40 and the microbubble generator 44 are connected by a first liquid feed pipe 47. A first pump 48 and a first valve 50 are interposed in the first liquid feed pipe 47. Similarly, the second tank 42 and the microbubble generator 44 are connected by a second liquid feed pipe 56 in which a second pump 52 and a second valve 54 are interposed.

The microbubble generator 44 is a well-known device which, as described in, e.g. JP-A No. H08-230760 and JP-A No. 2005-334869, takes in a gas (e.g. air) and generates, in a liquid, gas microbubbles measuring about 0.01 to 0.1 mm in diameter using the gas. Namely, the mixture and the water are mixed in an environment where gas microbubbles are generated.

The microbubble generator 44 and the fuel injection valve 46 are connected by a third liquid feed pipe 58. A third pump 60 and a fuel pressure adjusting valve 62 are interposed in the third liquid feed pipe 58.

An end portion of the fuel injection valve 46 is implanted in the supply pipe 24 such that a mixed fuel can be injected into the supply pipe 24 through the end portion.

The fuel supply system 10 according to the first embodiment is basically configured as described above. Next, the operation and effects of the fuel supply system 10 will be described in connection with the operating method for the gasoline engine 12.

In the first embodiment, when the first and second pumps 48 and 52 are operated, the first and second valves 50 and 54 are opened to a predetermined degree. As a result, the mixture of gasoline and ethanol and the water are fed, in a predetermined proportion, to the microbubble generator 44 via the first and second liquid feed pipes 47 and 56, respectively, When the three-liquid mixture is received, the microbubble generator 44 generates, using the air it takes in, microbubbles in the three-liquid mixture. The microbubbles thus generated finely breaks the three liquids into fine particles. In this process, with the ethanol being fairly miscible with both the gasoline and the water, it can occur that the water mixes with the ethanol that has mixed with the gasoline. Thus, the water and gasoline mix with each other causing no phase separation and, as a result, a mixed fuel is generated.

The mixed fuel containing the water, ethanol, and gasoline mixed without being phase-separated is sent, by the third pump 60, to the fuel injection valve 46 via the third liquid feed pipe 58. The mixed fuel is then injected from the fuel injection valve 46 into the supply pipe 24 to be mixed with air flowing in the supply pipe 24. At this time, the mixed fuel injection pressure is controlled by the fuel pressure adjusting valve 62.

The mixed fuel and air are supplied to the combustion chamber 14 in the cylinder block 16 when the intake port 20 is opened. Subsequently, when the piston 18 reaches the top dead center, the spark plug 34 ignites the mixed fuel and air. As a result, the mixed fuel and air burn causing the gasoline engine 12 to generate motive power.

As described above, the mixed fuel contains water. As well-known, when water vaporizes, it cools its surround. The temperature rise in the combustion chamber 14 is therefore smaller than when a fuel containing no water is burned. In other words, the combustion temperature is lowered and NOx generation is reduced. It also becomes possible to avoid knocking attributable to abnormal combustion.

Namely, according to the first embodiment, a three-liquid mixed fuel generated by the microbubble generator 44 is used, so that the combustion temperature in the combustion chamber 14 can be lowered. This makes it possible to reduce NOx generation and avoid knocking.

Of the three liquids, water is the cheapest. Ethanol is also cheaper than gasoline. The operating cost of the gasoline engine 12 can therefore be reduced by using, instead of gasoline only, a three-liquid mixed fuel containing water, ethanol, and gasoline.

The exhaust gas generated by the above combustion flows into the exhaust pipe 26 when the exhaust valve 30 opens the exhaust port 22 and is released into the air. As described above, in the present embodiment, a mixed fuel containing water and ethanol is used, so that NOx generation is remarkably reduced compared with cases in which gasoline only or a mixture of ethanol and gasoline is used as fuel. This can remarkably reduce the burden on the environment.

Figure 2:
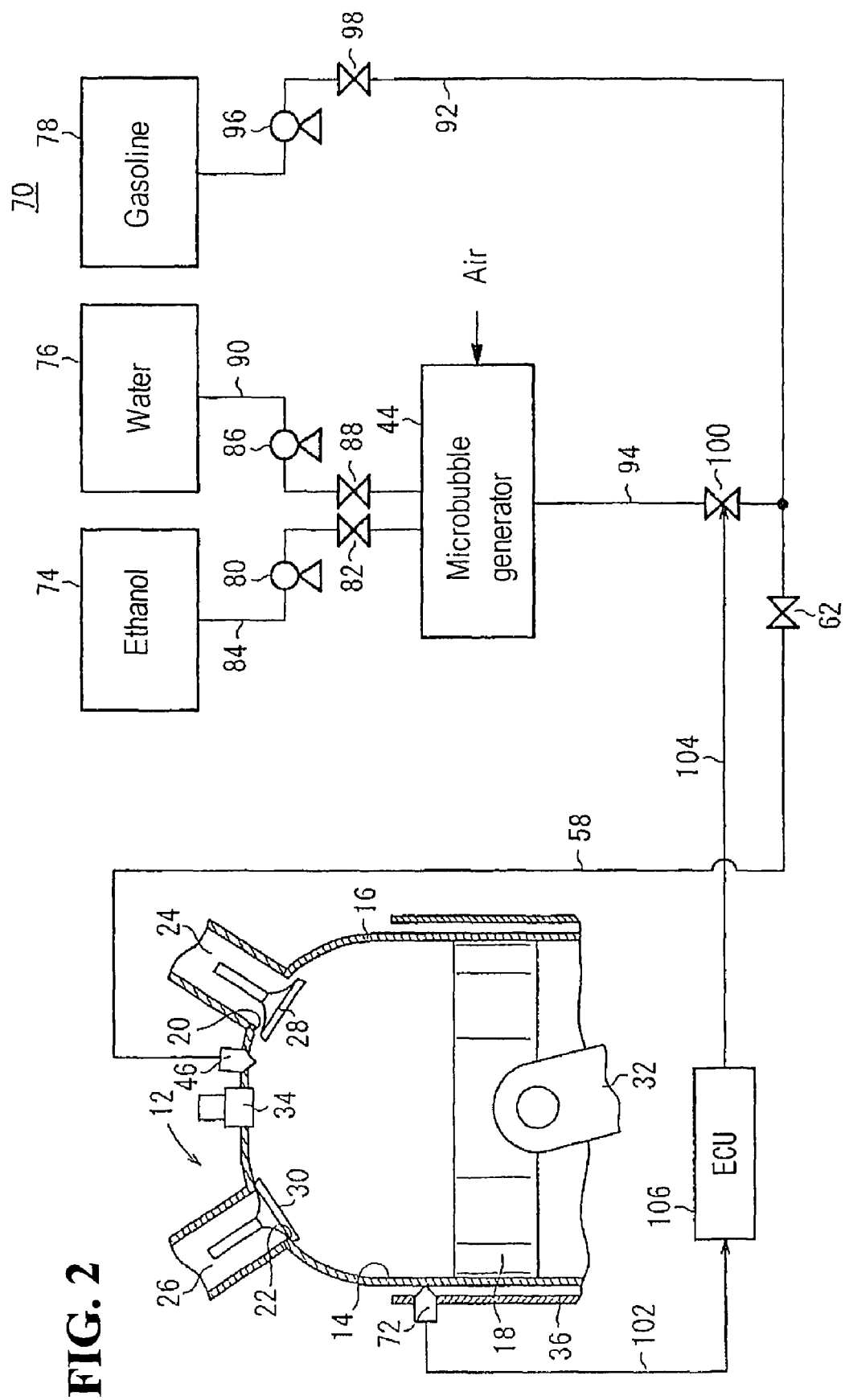
FIG. 2 is a schematic diagram for explaining an overall configuration of a fuel supply system according to a second embodiment of the present embodiment.

Next, a fuel supply system 70 according to a second embodiment will be described with reference to FIG. 2. In the following, the same constituent elements as those of the first embodiment will be denoted by the same reference numerals as used in the first embodiment, and detailed description of such elements will be omitted.

A gasoline engine 12 is configured to be similar to the gasoline engine 12 of the first embodiment. Namely, the gasoline engine 12 includes a cylinder block 16 provided with a combustion chamber 14 and a piston 18 which slides in the combustion chamber 14. An intake port 20 and an exhaust port 22 provided for the cylinder block 16 are respectively connected with a supply pipe 24 and an exhaust pipe 26. An intake valve 28 and an exhaust valve 30 are displaceably installed in the intake port 20 and the exhaust port 22, respectively.

In the second embodiment, a water temperature sensor 72 (detection means) is installed in the vicinity of a water jacket 36 surrounding the combustion chamber 14. As being described later, the water temperature sensor 72 detects the temperature of the cooling water circulating through the water jacket 36.

In the fuel supply system 70 according to the second embodiment, ethanol and water are stored separately. Namely, the fuel supply system 70 includes a first tank 74 storing ethanol, a second tank 76 storing water, a third tank 78 storing gasoline, a microbubble generator 44 connected to the first and second tanks 74 and 76, and a fuel injection valve 46 which injects a mixed fuel containing a mixture fed from the microbubble generator 44 and gasoline. An end portion of the fuel injection valve 46 is implanted in the cylinder block 16 such that the mixed fuel can be injected directly into the combustion chamber 14 through the end portion.

In the second embodiment, the first tank 74 and the microbubble generator 44 are connected by a first liquid feed pipe 84 in which a first pump 80 and a first valve 82 are interposed. Similarly, the second tank 76 and the microbubble generator 44 are connected by a second liquid feed pipe 90 in which a second pump 86 and a second valve 88 are interposed. The fuel injection valve 46 is connected to the third tank 78 via a third liquid feed pipe 92. The third liquid feed pipe 92 and the microbubble generator 44 are connected by a junction pipe 94. A third pump 96 and a third valve 98 are interposed in a section upstream of the junction pipe 94 of the third liquid feed pipe 92. A fuel pressure adjusting valve 62 is interposed in a section downstream of the junction pipe 94 of the third liquid feed pipe 92.

The junction pipe 94 is provided with a control valve 100. Namely, the mixture led out of the microbubble generator 44 is introduced into the third liquid feed pipe 92 via the control valve 100.

In the above configuration, the control valve 100 and the water temperature sensor 72 are electrically connected to an engine control unit (ECU 106), i.e. a control circuit, via cables 102 and 104, respectively.

The operation and effects of the fuel supply system 70 of the second embodiment configured as described above will be described in connection with the operating method for the gasoline engine 12.

In the second embodiment, the ethanol fed from the first tank 74 and the water fed from the second tank 76 are mixed in the microbubble generator 44. In the process, as in the first embodiment, microbubbles are generated leading to formation of a mixture of particles. Gasoline is supplied from the third tank 78 when the third pump operates.

The ECU 106 opens the control valve 100 to a predetermined degree via the cable 104, thereby causing the mixture generated in the microbubble generator 44 to flow through the junction pipe 94. The mixture joins the gasoline in a section upstream of the fuel pressure adjusting valve 62 of the third liquid feed pipe 92.

When joining the gasoline, the mixture made up of particles formed in the microbubble generator 44 is approximately evenly mixed with the gasoline, so that a mixed fuel of the water, gasoline and ethanol is obtained.

The mixed fuel thus obtained passes the fuel pressure adjusting valve 62 set to a predetermined degree of opening. The mixed fuel is then fed into the combustion chamber 14 via the fuel injection valve 46 when the intake valve 28 opens the intake port 20 causing the air coming through the supply pipe 24 to enter the combustion chamber 14.

In this case, too, the same as explained for the first embodiment, low-temperature combustion can take place in the combustion chamber 14, so that NOx generation is remarkably reduced.

When the ratio of the ethanol-water mixture to gasoline is extremely high, the temperature in the combustion chamber 14 extremely lowers. In such a case, part of the gasoline in the combustion chamber is possibly left unburned.

In the second embodiment, the temperature in the water jacket 36 is detected by the water temperature sensor 72. When the temperature in the combustion chamber 14 extremely lowers, the heat transmitted to the cooling water in the water jacket 36 is reduced, so that the cooling water temperature drops. When the cooling water temperature drops below a predetermined threshold value, the water temperature sensor 72 transmits a low-water-temperature signal to the ECU 106 via the cable 102. When the signal is received, the ECU 106 issues a control signal for reducing the degree of opening of the control valve 100.

Consequently, the flow rate of the mixture sent to the third liquid feed pipe 92 decreases. As a result, the proportion of the gasoline in the mixed fuel increases and the combustion temperature in the combustion chamber 14 rises.

Conversely, when the temperature in the combustion chamber 14 extremely rises, the cooling water temperature in the water jacket 36 rises. When the cooling water temperature exceeds a predetermined threshold value, the water temperature sensor 72 transmits a high-water-temperature signal to the ECU 106 via the cable 102. When the signal is received, the ECU 106 issues a control signal for increasing the degree of opening of the control valve 100. Consequently, the flow rate of the mixture sent to the third liquid feed pipe 92 decreases, and the proportion of the mixture in the mixed fuel decreases. As a result, the combustion temperature in the combustion chamber 14 lowers.

As described above, the second embodiment has an advantage in that the combustion temperature in the combustion chamber 14 can be controlled to be in an appropriate range.

Even though, in the first embodiment, the fuel injection valve 46 is implanted in the supply pipe 24 for supplying air, the fuel injection valve 46 may be implanted in the cylinder block 16 as in the second embodiment. In the second embodiment, the fuel injection valve 46 may be implanted in the supply pipe 24 for supplying air as in the first embodiment.

Even though, in the second embodiment, the water temperature sensor 72 is used as detection means, the detection means may be knock detection means. The knock detection means may be an in-cylinder pressure sensor which detects a pressure change in the combustion chamber 14 or a vibration sensor which detects vibration of the cylinder block 16. In either case, when the ECU 106 receives a knock detection signal from the knock detection means, the ECU 106 performs control to open the control valve 100.

Detection means as the one described above may also be used in the first embodiment, too, while electrically connecting the ECU 106 and the second valve 54 and making arrangement such that the degree of opening of the second valve 54 and the amount of water to be added are controlled by the ECU 106 based on the operating condition of the gasoline engine 12 detected by the detection means.

Furthermore, a mixing device other than the microbubble generator 44 may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine operating method for obtaining motive power, comprising:
   storing a mixture of gasoline and ethanol in a first tank,
   storing water in a second tank,
   preparing a mixed fuel by mixing the mixture supplied from the first tank and the water supplied from the second tank in a mixing device, and
   supplying the mixed fuel to a combustion chamber of an internal combustion engine by use of a fuel injection valve,
   burning a mixed fuel in a combustion chamber of the internal combustion engine,
   wherein the first tank and the mixing device are connected by a first liquid feed pipe in which a first pump and a first valve are interposed,
   the second tank and the mixing device are connected by a second liquid feed pipe in which a second pump and a second valve are interposed, and
   the mixing device and the fuel injection valve are connected by a third liquid feed pipe in which a third pump and a fuel pressure adjusting valve are interposed.

2. The internal combustion engine operating method for obtaining motive power according to claim 1, wherein the mixing device is a microbubble generator.

3. An internal combustion engine operating method for obtaining motive power, comprising:
   storing ethanol in a first tank,
   storing water in a second tank,
   a third tank storing gasoline,
   preparing a mixture in a mixing device for mixing the ethanol supplied from the first tank and the water supplied from the second tank,
   controlling a supply of the mixture by a control valve, and
   supplying a mixed fuel of the mixture and the gasoline supplied from the third tank to a combustion chamber of an internal combustion engine by using a fuel injection valve disposed downstream of the control valve, and
   burning a mixed fuel in a combustion chamber of the internal combustion engine.

4. The internal combustion engine operating method for obtaining motive power according claim 3, wherein the mixing device is a microbubble generator.

5. The internal combustion engine operating method according to claim 3, further comprising the steps of:
   controlling a ratio of the mixture to be added to the gasoline using control means; and
   adjusting the ratio of the mixture to be added based on information from detection means which detects an operating condition of the internal combustion engine.

6. A fuel supply system for supplying a mixed fuel to a combustion chamber of an internal combustion engine, comprising:
- a first tank storing a mixture of gasoline and ethanol,
- a second tank storing water,
- a microbubble generator for preparing a mixed fuel by mixing the mixture supplied from the first tank and the water supplied from the second tank, and
- a fuel injection valve for supplying the mixed fuel to a combustion chamber of an internal combustion engine,
- wherein the first tank and the microbubble generator are connected by a first liquid feed pipe in which a first pump and a first valve are interposed,
- the second tank and the microbubble generator are connected by a second liquid feed pipe in which a second pump and a second valve are interposed, and
- the microbubble generator and the fuel injection valve are connected by a third liquid feed pipe in which a third pump and a fuel pressure adjusting valve are interposed.

7. The fuel supply system according to claim 6,
wherein the fuel injection valve is installed in a supply pipe for supplying air to the combustion chamber of the internal combustion engine.

8. The fuel supply system according to claim 6,
wherein the fuel injection valve is installed exposed in the combustion chamber of the internal combustion engine.

9. A fuel supply system for supplying a mixed fuel to a combustion chamber of an internal combustion engine, comprising:
- a first tank storing ethanol,
- a second tank storing water,
- a third tank storing gasoline,
- a mixing device for preparing a mixture by mixing the ethanol supplied from the first tank and the water supplied from the second tank,
- a control valve which controls a supply of the mixture, and
- a fuel injection valve, disposed downstream of the control valve, for supplying a mixed fuel of the mixture and the gasoline supplied from the third tank to a combustion chamber of an internal combustion engine.

10. The fuel supply system according to claim 9,
wherein the fuel injection valve is installed in a supply pipe for supplying air to the combustion chamber of the internal combustion engine.

11. The fuel supply system according to claim 9,
wherein the fuel injection valve is installed exposed in the combustion chamber of the internal combustion engine.

12. The fuel supply system according to claim 9, wherein the mixing device is a microbubble generator.

13. The fuel supply system according to claim 9, further comprising detection means for detecting operating condition of the combustion chamber and control means for controlling a degree of opening of the control valve,
wherein the control means controls a flow rate of the mixture by controlling the degree of opening of the control valve based on information from the detection means.

14. The fuel supply system according to claim 13,
wherein the fuel injection valve is installed in a supply pipe for supplying air to the combustion chamber of the internal combustion engine.

15. The fuel supply system according to claim 13,
wherein the fuel injection valve is installed exposed in the combustion chamber of the internal combustion engine.

16. The fuel supply system according to claim 13,
wherein the detection means is either of temperature detection means which detects a temperature of coolant to cool the internal combustion engine and knocking detection means which detects knocking.

17. The fuel supply system according to claim 16,
wherein the fuel injection valve is installed in a supply pipe for supplying air to the combustion chamber of the internal combustion engine.

18. The fuel supply system according to claim 16,
wherein the fuel injection valve is installed exposed in the combustion chamber of the internal combustion engine.

* * * * *